United States Patent

Besecke et al.

[11] Patent Number: 6,077,911
[45] Date of Patent: Jun. 20, 2000

[54] IMIDATION OF POLYMERS BASED ON ESTERS OF METHACRYLIC ACID AND ACRYLIC ACID

[75] Inventors: Siegmund Besecke, Hameln; Andreas Deckers; Juergen Hofmann, both of Ludwigshafen; Harald Kroeger, Schifferstadt; Hilmar Ohlig, Kaiserlautern, all of Germany

[73] Assignee: BASF Aktiwngesellschaft, Germany

[21] Appl. No.: 08/097,117

[22] Filed: Jul. 27, 1993

[51] Int. Cl.$^7$ ............................................. C08F 8/30
[52] U.S. Cl. ................... 525/329.9; 525/330.5; 525/374; 525/378; 525/379
[58] Field of Search ............... 525/329.5, 329.9, 525/330.5, 374, 378, 379, 329.7

[56] References Cited

U.S. PATENT DOCUMENTS

| | | | |
|---|---|---|---|
| 2,146,209 | 2/1939 | DeWitt | 260/2 |
| 4,246,374 | 1/1981 | Kopchik | 525/398 |
| 4,246,376 | 1/1981 | Didomenico, Jr. | 525/398 |
| 5,110,877 | 5/1992 | Hoess et al. | 525/378 |

FOREIGN PATENT DOCUMENTS

| | | |
|---|---|---|
| 200 530 | 11/1986 | European Pat. Off. . |
| 376749 | 7/1990 | European Pat. Off. . |
| 26 52 118 | 6/1976 | Germany . |
| 40 02 904 | 2/1990 | Germany . |
| 2 101 139 | 1/1983 | United Kingdom . |

*Primary Examiner*—Paul Thibodeau
*Assistant Examiner*—D. Lawrence Tarazano
*Attorney, Agent, or Firm*—Keil & Weinkauf

[57] ABSTRACT

Polymers essentially comprising units of the formula I

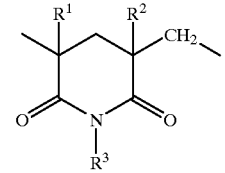

in which $R^1$ and $R^2$ are hydrogen or methyl and
$R^3$ is hydrogen, $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, it being possible for these radicals, with the exception of the $C_1$–$C_{18}$-alkyl radicals, to be up to trisubstituted by radicals selected from the group consisting of $C_1$–$C_4$-alkyl, $C_1$–$C_4$-alkoxy and halogen, are prepared by reacting a polymer based on $C_1$–$C_{20}$-alkyl esters of acrylic acid, methacrylic acid or mixtures thereof with ammonia or a primary amine in an extruder, by mixing the ammonia or the primary amine by mixing intensively with a melt of the polymer to be reacted, at at most 250° C., before the imidation is carried out, and are used for producing thermoplastic moldings, films or fibers.

6 Claims, No Drawings

IMIDATION OF POLYMERS BASED ON ESTERS OF METHACRYLIC ACID AND ACRYLIC ACID

The present invention relates to a process for preparing a polymer, essentially comprising units of the formula I

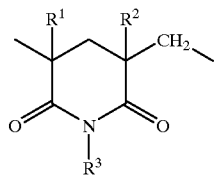

in which

R$^1$ and R$^2$ are hydrogen or methyl and

R$^3$ is hydrogen, C$_1$–C$_{18}$-alkyl, C$_5$–C$_{12}$-cycloalkyl, C$_6$–C$_{10}$-aryl or C$_6$–C$_{10}$-aryl-C$_1$–C$_4$-alkyl, it being possible for these radicals, with the exception of the C$_1$–C$_{18}$-alkyl radicals, to be up to trisubstituted by radicals selected from the group consisting of C$_1$–C$_4$-alkyl, C$_1$–C$_4$-alkoxy and halogen, by reacting a polymer based on C$_1$–C$_{20}$-alkyl esters of acrylic acid, methacrylic acid or mixtures thereof with ammonia or a primary amine in an extruder, which comprises mixing the ammonia or the primary amine intensively with a melt of the polymer to be reacted, at at most 250° C., before the imidation is carried out.

The invention also relates to the use of the polymers prepared by this process for producing thermoplastic moldings, films or fibers and to moldings, films or fibers made from these polymers.

Polymers based on C$_1$–C$_{20}$-alkyl esters of (meth)acrylic acid, the most frequent representatives of which are methyl methacrylate and methyl acrylate, are distinguished by outstanding transparency and stability to weathering. For these reasons, polymethyl methacrylates ("PMMA") are used, for example, for the production of optically demanding components, such as lenses, and for lamp covers.

However, acrylic molding compositions of this type have too low a heat distortion resistance for several applications. One possible solution is to increase the glass transition temperature by a reaction similar to a polymer reaction, for example of PMMA with primary amines (imidation), with the formation of cyclic imide structures (see equation 1):

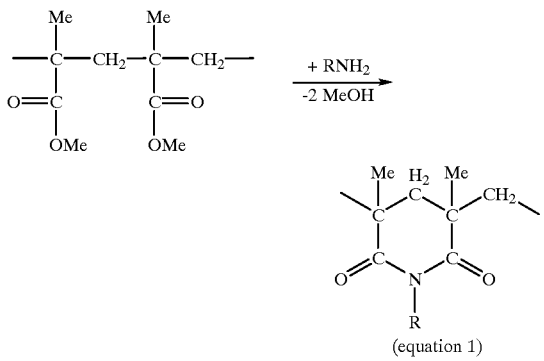

(equation 1)

As has been disclosed (cf. EP-A 376,749, page 6, lines 21–26), the imidation of PMMA in an aqueous medium leads, because of the free carboxyl groups present in the end product, to reduced flowability of the polymer and to increased absorption of water, to an increased tendency to stress corrosion cracking and to a reduction in the resistance to weathering.

The imidation of PMMA in an anhydrous medium is described, for example, in U.S. Pat. No. 2,146,209, in which the reaction is carried out in solvents such as biphenyl or diethylene glycol, or without a solvent. Apart from the toxicity (biphenyl) and the high cost of removing the solvents because of their high boiling points, this process gives non-uniformly imidated products of reduced transparency, which have a yellow inherent color and poor solubility.

Poly(meth)acrylimides having improved properties, such as better solubility and higher stability to heat, are obtained according to DE-A 26 52 118, which describes a process for reacting methacrylic and acrylic polymers with anhydrous amines in an extruder at from 200 to 450° C. A disadvantage is that the resulting product has a high free carboxyl group content (high acid value).

DE-A 40 02 904 describes a process for preparing polymethacrylimides by reacting polymethyl methacrylate ("PMMA") with primary amines on an extruder, the amine being fed into the extruder at diverse points. By virtue of this process measure, it is possible to prepare a polymethacrylimide which has a reduced acid value, compared with the product from DE-A 26 52 118.

The situation is similar in the case of the process described in U.S. Pat. No. 4,246,374, in which PMMA is imidated solvent-free in an extruder. However, here also, because of the high reaction temperature, water of reaction forms, which leads to partially saponified polymers having acid values of about 1 equivalent per kilogram of polymer and to reduced transparency. Byproducts such as ethers and di- and trialkylamines are a further disadvantage.

In the processes described, products are obtained which, because of non-uniform imidation, have only inadequate optical properties. This is discernible, in particular, in a high yellowness index and severe opacity. In order to eliminate yellow discoloration, "bluing agents" or fluorescent brighteners are added to the molding compositions. However, this aftertreatment increases the product and process costs.

It is an object of the present invention to provide, by reducing the inhomogeneities in the imidation of polymers based on C$_1$–C$_{20}$-alkyl esters of acrylic acid, methacrylic acid or mixtures thereof, products which have lower opacity and an improved yellowness index.

We have found that this object is achieved by the process defined at the outset.

In addition, we have found that the polymers prepared by this process can be used for producing thermoplastic moldings, films or fibers, and also moldings, films or fibers composed of these polymers have been found.

According to the invention, the ammonia or the amine is mixed with a melt of a polymer based on C$_1$–C$_{20}$-alkyl esters of acrylic acid, methacrylic acid or mixtures thereof, for example in an extruder or in a static mixer, preferably in an extruder which preferably has screw elements. In general, the mixing screw elements used in an extruder can be conveying or take no part in conveying.

Expediently, the polymer to be imidated is melted in an extruder in a manner known per se and ammonia or an amine is then supplied to the melt, in a manner also known per se.

According to the invention, the temperature during the mixing operation is set at below 250° C., preferably from 200 to 250° C. and particularly preferably from 220 to 230° C. Above 250° C. uncontrolled imidation of the (meth) acrylic polymer generally takes place, which, according to observations made hitherto, leads to inhomogeneous poly (meth)acrylimides ("PMI").

The mixing time is generally from 10 to 100 sec.

If mixing is carried out in an extruder, the type of extruder has, according to observations made to date, in principle no effect on the success of the invention. However, extruders which have an L/D ratio of from 5 to 30 have proved advantageous.

An embodiment in which mixing is carried out in a side extruder and the mixed melt is then imidated in the main extruder has proven particularly advantageous.

For the purposes of the invention, polymers based on $C_1$–$C_{20}$-alkyl esters of (meth)acrylic acid are both homopolymers and copolymers, it being possible for the copolymers also to contain other ethylenically unsaturated comonomers.

Preferred $C_1$–$C_{20}$-alkyl esters of methacrylic acid are the $C_1$–$C_4$-alkyl esters, such as methyl methacrylate ("MMA"), ethyl methacrylate, propyl methacrylate, n-butyl methacrylate, isobutyl methacrylate and tert-butyl methacrylate, methyl methacrylate being particularly preferred, and also mixtures of these monomers.

The $C_1$–$C_{20}$-alkyl esters of acrylic acid used are preferably the $C_1$–$C_4$-alkyl esters, such as methyl acrylate ("MA"), ethyl acrylate, propyl acrylate, n-butyl acrylate, isobutyl acrylate and tert-butyl acrylate, methyl acrylate being particularly preferred, and also mixtures of these monomers.

Ethylenically unsaturated comonomers which can be used are acrylic acid, methacrylic acid, maleic acid derivatives, such as the anhydride, imides and $C_1$–$C_{10}$-alkyl esters, itaconic acid derivatives, such as imides and $C_1$–$C_{10}$-alkyl esters, acrylonitrile and methacrylonitrile, styrene, α-methylstyrene, ethylene, propylene and butadiene, and also mixtures thereof.

The polymers can be prepared in one or more stages, it being necessary in the case of multi-stage polymerization for at least the outer stage to contain groups which can be imidated.

In general, the polymers are made up to the extent of more than 50% by weight, preferably to the extent of more than 80% by weight, of $C_1$–$C_{20}$-alkyl esters of methacrylic acid and acrylic acid. According to observations made to date, polymers composed of 80 to 100% by weight of methyl methacrylate and 0 to 20% by weight of methyl acrylate in a molecular weight range ($M_w$) of from 20,000 to 300,000 g/mol have proved particularly advantageous.

The primary amine, $R^3NH_2$, used according to the invention is a primary amine selected from the group comprising ammonia, $C_1$–$C_{18}$-alkylamine, $C_5$–$C_{12}$-cycloalkylamine, $C_6$–$C_{10}$-arylamine and $C_5$–$C_{10}$-aryl-$C_1$–$C_4$-alkylamine, it being possible for the cycloalkyl, aryl and arylalkyl constituents of the amines to be up to trisubstituted by radicals selected from the group comprising $C_1$–$C_4$-alkyl, $C_1$–$C_4$-alkoxy and halogen, such as fluorine, chlorine and bromine.

Examples which may be mentioned are ammonia, methylamine, ethylamine, n-propylamine, i-propylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, cyclododecylamine, aniline, 2-, 3- and 4-methylaniline, 2-, 3- and 4-methoxyaniline, 2-, 3- and 4-chloroaniline, 2-, 3- and 4-bromoaniline, benzylamine, phenethylamine and phenylpropylamine and particularly preferably cyclohexylamine.

The weight ratio of amine used to acrylate polymer is generally chosen in the range of from 1:1 to 400:1, preferably of from 1:1 to 200:1.

The imidation of the melt mixed according to the invention is generally carried out in a manner known per se in an extruder the reaction zone of which has a length-to-diameter (L/D) ratio of from 20 to 50, preferably of from 30 to 40. An L/D ratio of more than 50 generally results in damage to the material, associated with yellow discoloration, because the dwell time is too long. An L/D ratio of less than 20 generally gives only a partially imidated product which has a high content of secondary amide groups, which have an adverse effect on the melt viscosity and water absorption.

The mixing elements used can be conventional elements, such as kneading blocks or toothed mixing elements for homogenizing the reaction mixture.

The reaction temperature is generally chosen within the range of from 250 to 350° C., preferably of from 270 to 350° C.

Because of the ammonia or amine used, the choice of pH range is generally above 7.

The reaction time is preferably within the range of from 1 to 20 min, preferably of from 2 to 10 min.

In addition, in order to accelerate the reaction, catalysts can be added to the reaction mixture in amounts within the range of from 0.01 to 10% by weight, based on the polymer employed. Examples are:

tertiary amines such as tricyclohexylamine;
substituted guanidines such as 1,1,3,3-tetramethylguanidine and 1,3-diphenylguanidine;
tetrasubstituted alkylammonium compounds such as trimethylstearylammonium chloride;
organic titanium compounds such as tetrapropoxytitanium and tetrabutoxytitanium;
organic tin compounds such as dibutyltin oxide and dibutyltin didodecanate;
aromatic amines such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl;
imides such as N,N'-dicyclohexylcarbodiimide;
and also antimony trioxide, tin dioxide, sodium amide, sodium alcoholates and potassium alcoholates, such as sodium methanolate and potassium methanolate, ammonium chloride and ammonium iodide.

The catalysts can be added before, during or after the mixing operation, preferably afterwards.

In a further preferred embodiment, the (main) extruder has a vent zone downstream of the reaction zone, ie. at least one opening through which volatile constituents and non-polymer reaction products can be removed. Venting can be carried out either under atmospheric pressure or under reduced pressure (vacuum venting). The use of atmospheric pressure venting in combination with vacuum venting has proved particularly advantageous.

The poly(meth)acrylimides prepared according to the invention can be processed by conventional methods, for example by injection molding, extrusion or sintering to produce moldings, films or fibers.

Compared with known processes, the process according to the invention has the advantage that the poly(meth)acrylimides prepared according to the invention are more homogeneous and less opaque and have an improved yellowness index compared with poly(meth)acrylimides which have been prepared by an extruder process from the prior art.

EXAMPLES

Examples 1 to 3

20 kg of PMMA (comprising 99% by weight of MMA and 1% by weight of MA and having an average molecular weight ($M_n$) of 115,000 g/mol) per hour were metered continuously into a twin screw extruder with co-rotating, intermeshing screws (ZSK-30, W&P). The housing temperature was set at the value indicated in Table 1. After the polymer had melted, 10 kg of cyclohexylamine per hour were pumped continuously into the extruder using a piston metering pump, in such a way that the melt and the amine were mixed by installed toothed disk elements. The amine/PMMA mixture was then conveyed into the actual reaction extruder (ZSK-40, W&P), where it was heated to 270° C. The L/D ratio of the reaction zone was 40. The reaction mixture was then vented through an atmospheric pressure vent and a vacuum vent and then granulated.

The results of the quality tests are given in the table.

| Example | Mixing temperature [° C.] | Opacity | $Y_i$ yellowness index |
|---|---|---|---|
| 1 | 230 | 1.8 | 1.3 |
| 2 | 240 | 1.9 | 1.4 |
| Comparison Example 1 | 270 | 3.1 | 2.9 |

Comparison Examples 2 to 4

The following experiments were carried out on the same extruder arrangement as described in the previous examples, except that the toothed disk elements for mixing in the amine were replaced by neutral, non-conveying and non-mixing screw elements.

| Example | Mixing temperature [° C.] | Opacity | $Y_i$ yellowness index |
|---|---|---|---|
| 2 | 230 | 3.9 | 2.8 |
| 3 | 240 | 4.1 | 3.1 |
| 4 | 270 | 4.7 | 4.1 |

The $Y_i$ yellowness index was determined in accordance with DIN 6 167 on circular disks (Ø = 80 min, d = 6 mm).
The opacity was determined in accordance with DIN 5 036, Part 3.

We claim:

1. A process for preparing a polymer, essentially comprising units of the formula I

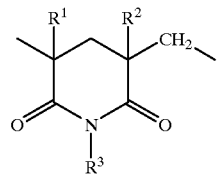

in which $R^1$ and $R^2$ are hydrogen or methyl and $R^3$ is hydrogen, $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, with these radicals, with the exception of the $C_1$–$C_{18}$-alkyl radicals, being optionally substituted by one to three radicals selected from the group consisting of $C_1$–$C_4$-alkyl, $C_1$–$C_4$-alkoxy and halogen, by reacting a polymer based on $C_1$–$C_{20}$-alkyl esters of acrylic acid, methacrylic acid or mixtures thereof with ammonia or a primary amine in an extruder, which comprises (a) mixing the ammonia or the primary amine intensively with a melt of the polymer to be reacted, in a first extruder at from 200 to 250° C., whereby the mixing time is from 10 to 100 sec, and the L/D ratio is from 5 to 30, yielding a mixed melt, (b) imidizing the mixed melt in a second extruder having a L/D ratio of from 20 to 50 at a temperature within the range of from 250 to 350° C.

2. A process for preparing a polymer as claimed in claim 1, wherein low molecular weight substances are removed from the reaction mixture at the end of the imidation zone through at least one vent.

3. A process as claimed in claim 1, wherein the first extruder contains toothed mixing elements.

4. A process as defined in claim 1, wherein the temperature in the second extruder is within the range of from 270 to 350° C.

5. A process as defined in claim 1, wherein the temperature in the first extruder is from 220 to 230° C. and the temperature in the second extruder is with in the range of from 270 to 350° C.

6. A molding, film or fiber produced from a polymer obtained as claimed in claim 3.

* * * * *